(12) United States Patent
Leone et al.

(10) Patent No.: US 7,913,096 B2
(45) Date of Patent: Mar. 22, 2011

(54) METHOD AND SYSTEM FOR THE CIPHER KEY CONTROLLED EXPLOITATION OF DATA RESOURCES, RELATED NETWORK AND COMPUTER PROGRAM PRODUCTS

(75) Inventors: Manuel Leone, Turin (IT); Ettore Elio Caprella, Turin (IT)

(73) Assignee: Telecom Italia S.p.A., Milan (IT)

( * ) Notice: Subject to any disclaimer, the term of this patent is extended or adjusted under 35 U.S.C. 154(b) by 922 days.

(21) Appl. No.: 10/584,864

(22) PCT Filed: Dec. 30, 2003

(86) PCT No.: PCT/EP03/14969
§ 371 (c)(1),
(2), (4) Date: Jun. 28, 2006

(87) PCT Pub. No.: WO2005/064430
PCT Pub. Date: Jul. 14, 2005

(65) Prior Publication Data
US 2007/0079142 A1      Apr. 5, 2007

(51) Int. Cl.
*H04L 29/06* (2006.01)
*G06F 11/30* (2006.01)
*G06F 12/14* (2006.01)
*H04K 1/04* (2006.01)
*H04K 1/06* (2006.01)
*H04K 1/00* (2006.01)

(52) U.S. Cl. ........... 713/193; 713/155; 380/44; 380/273
(58) Field of Classification Search .................. 713/193, 713/155; 380/44, 273
See application file for complete search history.

(56) References Cited

U.S. PATENT DOCUMENTS

| 5,534,857 | A  | * | 7/1996  | Laing et al. ................... 340/5.74 |
| 6,373,946 | B1 |   | 4/2002  | Johnston |
| 6,504,932 | B1 | * | 1/2003  | Vasnier et al. ................. 380/273 |
| 6,591,364 | B1 | * | 7/2003  | Patel ............................. 713/170 |
| 6,690,930 | B1 | * | 2/2004  | Dupre ........................... 455/411 |
| 7,177,425 | B2 | * | 2/2007  | Ben-Chuan et al. ............ 380/44 |
| 2002/0165008 | A1 |   | 11/2002 | Sashihara et al. |

(Continued)

FOREIGN PATENT DOCUMENTS

EP       0 537 925 A1       4/1993

(Continued)

OTHER PUBLICATIONS

Menezes, et al., "Handbook of Applied Cryptography", Chapter 9, CRC Press, Inc., pp. 320-383, (1997).

(Continued)

*Primary Examiner* — Shin-Hon Chen
(74) *Attorney, Agent, or Firm* — Finnegan, Henderson, Farabow, Garrett & Dunner, L.L.P.

(57) ABSTRACT

An arrangement for the cipher controlled exploitation of data resources (e.g., securely storing and retrieving sensitive data or securely registering and logging on a computer system) includes the steps of providing a subscriber identity module carrying a security algorithm; generating at least one, e.g., two, random values; subjecting the random value to the at least one security algorithm to generate at least one, e.g., two, session keys; processing the session keys via a mixer function such as a hash function to produce a cipher key; and using the cipher key thus produced for exploiting the data resources.

21 Claims, 6 Drawing Sheets

U.S. PATENT DOCUMENTS

Figure 1:
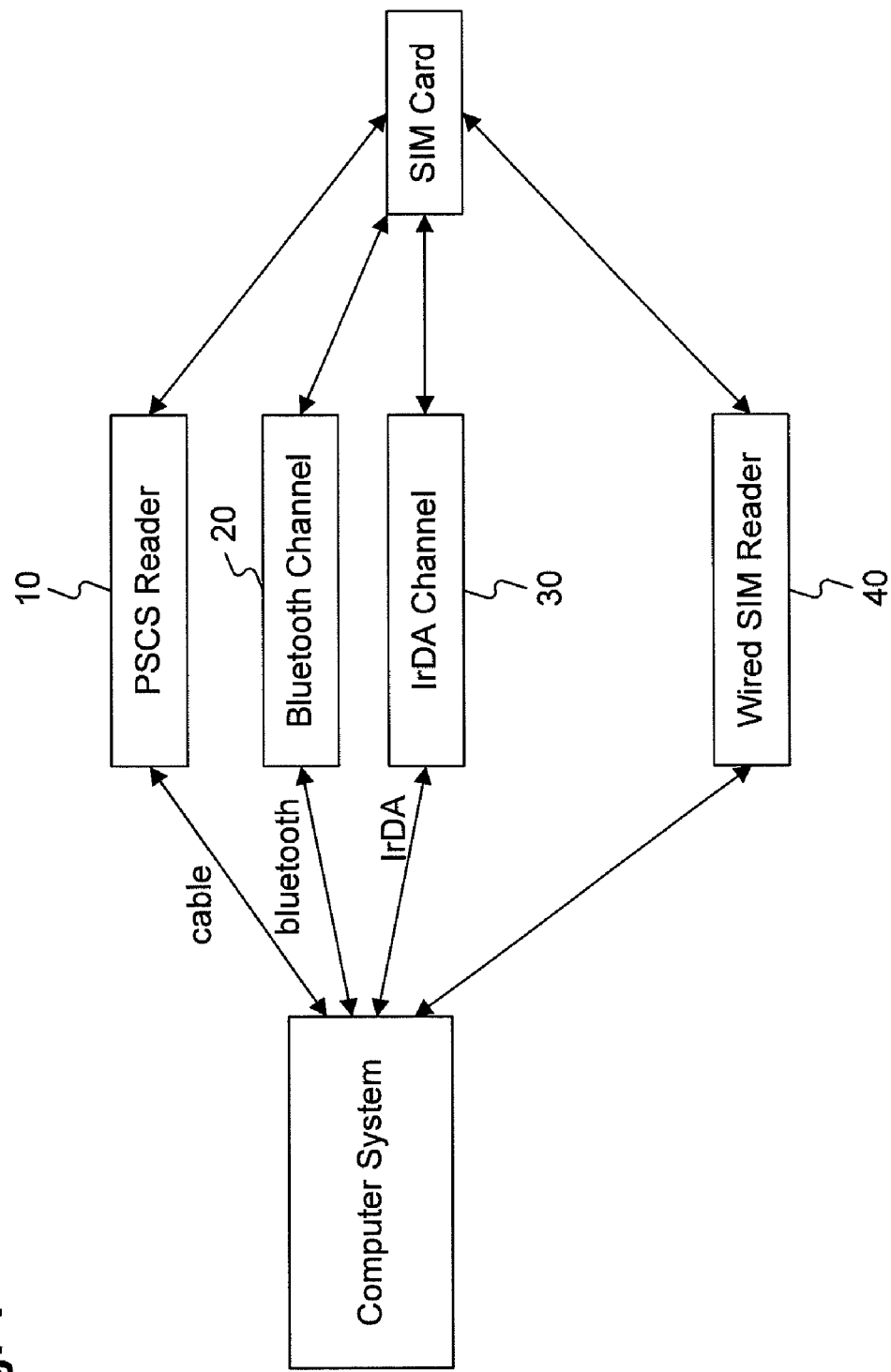

| | | | |
|---|---|---|---|
| 2003/0028763 A1 | 2/2003 | Malinen et al. | |
| 2004/0024846 A1* | 2/2004 | Randall et al. | 709/219 |
| 2004/0204124 A1* | 10/2004 | Campbell | 455/566 |
| 2004/0210766 A1* | 10/2004 | Kroselberg | 713/201 |
| 2005/0021940 A1* | 1/2005 | Ma | 713/155 |
| 2005/0037752 A1* | 2/2005 | Kwan et al. | 455/432.3 |

FOREIGN PATENT DOCUMENTS

| | | |
|---|---|---|
| EP | 1 223 495 A1 | 7/2002 |
| WO | WO 00/31608 | 6/2000 |
| WO | WO 02/054210 | 7/2002 |

OTHER PUBLICATIONS

"Secure Hash Standard", Federal Information Processing Standards Publication 180-2, pp. i-iv, 1-71, (Aug. 1, 2002).

"3 GPP TS 03.20", Global System for Mobile Communications, $3^{rd}$ Generation Partnership Project; Digital cellular telecommunications system (Phase 2+); Security related network functions, pp. 1-95, (2000).

"ETSI TS 100 977", Global System for Mobile Communications, Digital cellular telecommunications system (Phase 2+); Specification of the Subscriber Identity Module—Mobile Equipment (SIM—ME) interface, pp. 1-170, (2000).

* cited by examiner

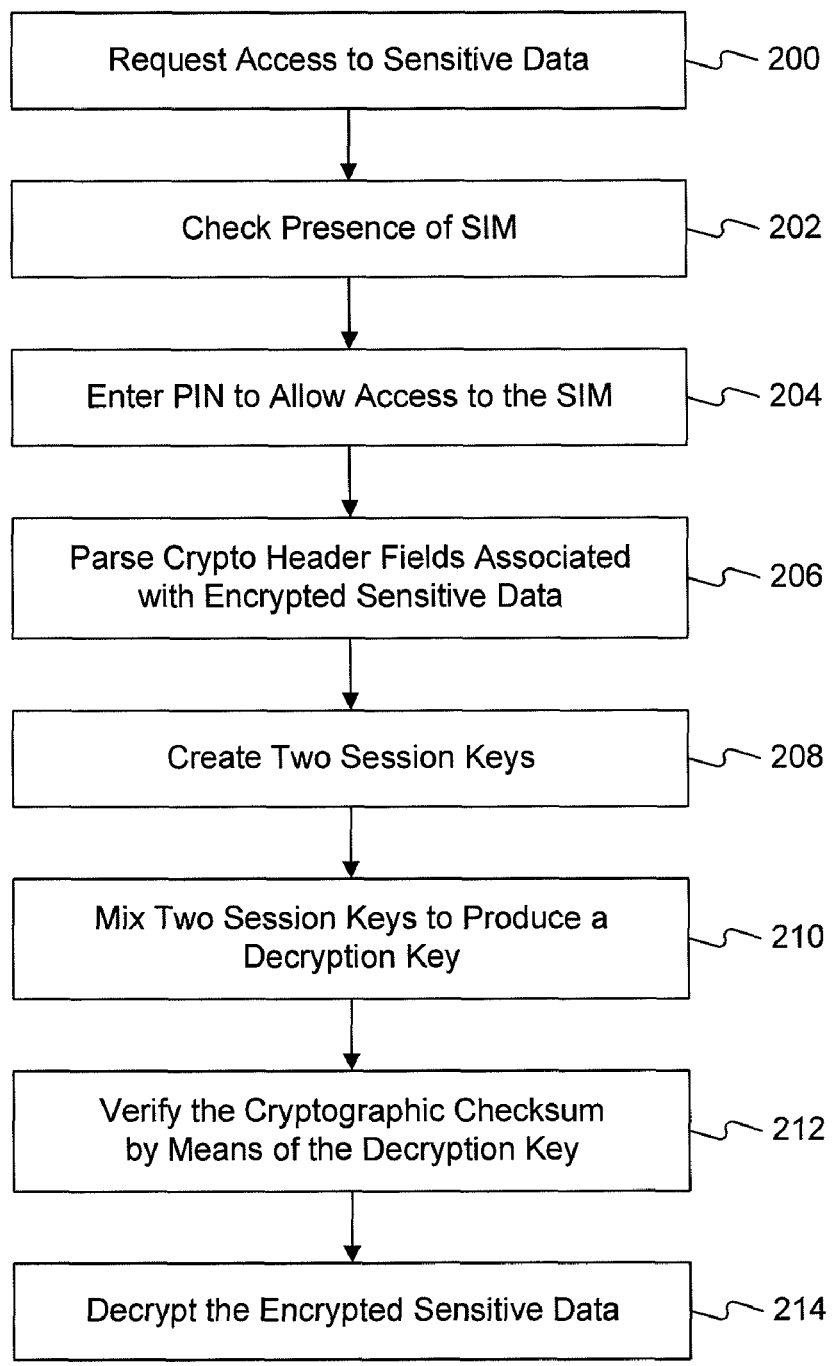

METHOD AND SYSTEM FOR THE CIPHER KEY CONTROLLED EXPLOITATION OF DATA RESOURCES, RELATED NETWORK AND COMPUTER PROGRAM PRODUCTS

CROSS REFERENCE TO RELATED APPLICATION

This application is a national phase application based on PCT/EP2003/014969, filed Dec. 30, 2003, the content of which is incorporated herein by reference.

FIELD OF THE INVENTION

The present invention relates to techniques for cipher key controlled exploitation of data resources, e.g. for cipher key controlled protection of sensitive data in a computer system and/or cipher key controlled registration and log on of a user in a computer system or a media content delivery network such as the Internet.

DESCRIPTION OF THE RELATED ART

Sensitive and valuable information in a computer system may be protected by making use of, e.g. passwords or passphrases. Those solutions are often very weak, due to the fact that users typically choose easy-to-remember passwords, which, in turn, can be broken by means of specific attacks, such as dictionary or brute force attacks and social engineering techniques. On the other hand, long and complex passwords or passphrases are more secure, but also less usable from a user point of view. Protecting valuable data in a computer system may also involve the use of "ad hoc" secure hardware, such as Smart Cards, USB Tokens or PCI/PCM-CIA Cards. Nonetheless, Smart Cards, USB Tokens, PCI/PCMCIA Cards are rarely used due to the costs of acquiring, distributing and managing these devices.

To overcome these drawbacks, WO-A-00/31608 proposes systems and methods for using a mobile telephone to automatically log a computer user onto a computer system. A subscriber identity module (SIM) is introduced to the computer system so that the computer system associates the SIM with the computer user. The SIM is then inserted into the mobile telephone. When the mobile telephone is powered on, the user is prompted for a personal identification number (PIN). When the user wishes to log onto the computer system, the user establishes a communication channel between the mobile telephone and the computer. The mobile telephone and computer exchange identification information and the computer user is automatically logged onto the computer system. An exemplary method for configuration of the system provides that the mobile telephone is set in a mode wherein information can be written into the SIM, e.g., the SAT configuration mode. The SIM contains a SIM application toolkit (SAT). SAT is a development environment incorporated in the GSM standard for writing programs which run on SIMs. To install the program which generates the public and private keys onto the SIM, the SIM is inserted into a smart card reader/writer. The computer generates a set of public and private keys. The public key is stored in an administrative database in the computer, or in a computer network. The private key is stored on the SIM. In addition the various parameters for coding data transferred between the mobile telephone and the computer are stored on the SIM. The various parameters are the numbers used in the RSA algorithm. Once the system has been configured to associate the SIM with one or more user accounts/identities of the computer system and the user of mobile telephone has entered the PIN into the mobile telephone, the user may automatically log onto the computer.

In US-A-2003/0028763 another arrangement is disclosed wherein a subscriber identity module (SIM) may be used to generate a copy of a key for a client to be used in accessing a requested resource within the framework of a modular authentication and authorization scheme for Internet protocol.

OBJECT AND SUMMARY OF THE INVENTION

The present invention aims at providing an arrangement implementing a secure and low-cost method for protecting any sensitive data stored in a computer system and/or a local access to the computer system itself.

This new protection level is achieved by means of a SIM (Subscriber Identity Module).

In the remainder of the present description and claims we shall define as SIM a SIM card typically involved in a GSM network or a USIM card typically involved in a UMTS network, or a similar card used in a different wireless network and provided with encryption based authentication or identification features, e.g., based on a challenge and response mechanism.

The SIM utilization provides a way to solve a client security problem, thanks to its reliable GSM/UMTS security functions. In particular, the arrangement described herein makes use of a SIM combined with a specific processing module installed in the computer system to securely generate strong cryptographic keys. These cryptographic keys are used to effectively encrypt sensitive data, such as confidential files, folders, virtual disks, software licenses or to protect user credentials needed to get local access to a computer system. As a consequence, only the legitimate SIM will be able to decrypt the sensitive data or to permit the local access to the computer system.

According to an aspect of the present invention, there is provided a method for the cipher controlled exploitation of data resources stored in a database associated to a computer system, including the steps of:
  providing a subscriber identity module carrying at least one security algorithm;
  producing a cipher key via said at least one security algorithm; and
  using said cipher key for protecting said data resources.

According to another aspect of the present invention, there is provided a system for the cipher-controlled exploitation of data resources, including:
  at least a subscriber identity module carrying at least one security algorithm;
  at least a computer system comprising at least one processing module, said processing module being interfaced with said subscriber identity module to generate at least one cipher key via said at least one security algorithm and is configured to protect via said cipher key said data resources; and
  a database associated to said computer system for storing said data resources protected by said cipher key.

According to further aspects of the present invention, there are provided a related communication network and a computer program product loadable in the memory of at least one computer and comprising software code portions for performing the steps of the method of invention when the product is run on a computer. Reference to "at least one computer" is evidently intended to highlight the possibility for the system of the invention to be implemented in a distributed modular fashion.

Further preferred aspects of the present invention are described in the dependent claims and in the following description.

BRIEF DESCRIPTION OF THE ANNEXED DRAWINGS

Figure 2:
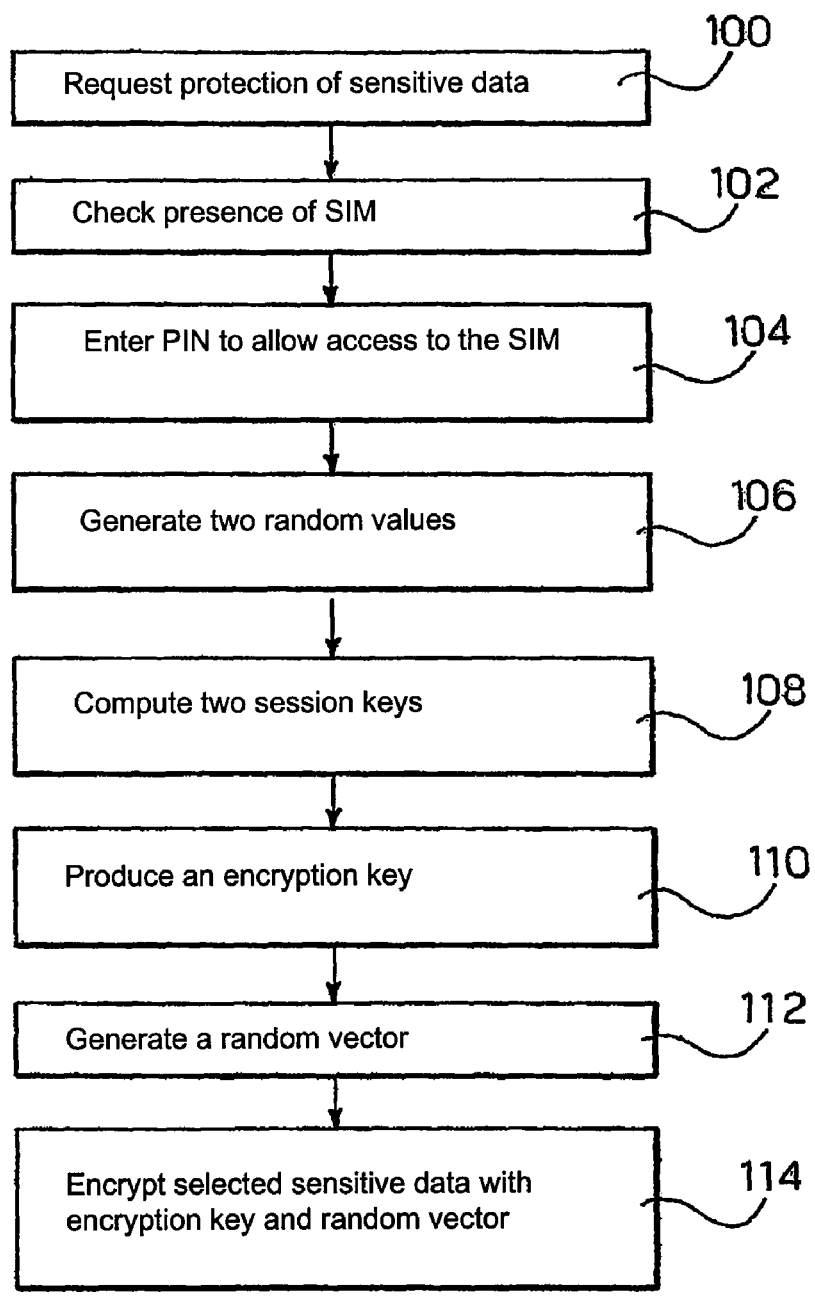
Figure 3:
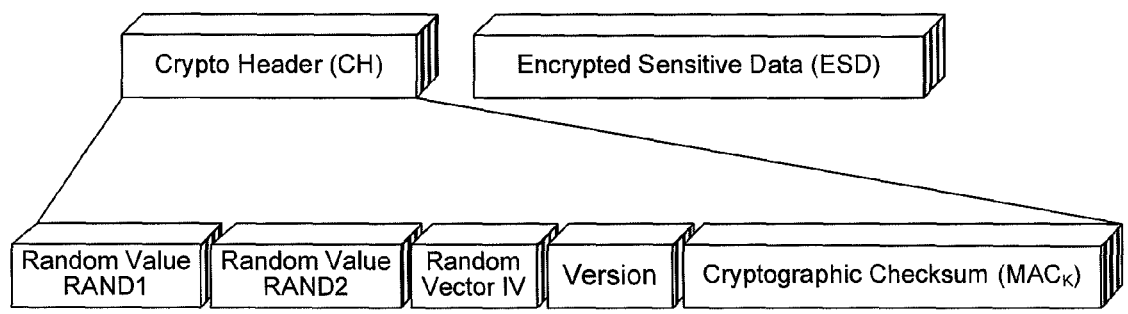
Figure 5:
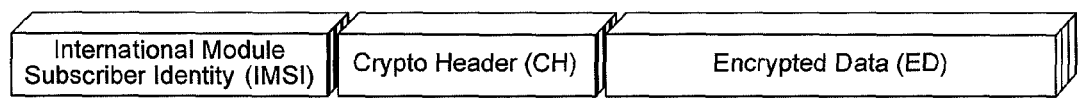

The invention will now be described, by way of example only, by referring to the annexed figures of drawing, wherein:

FIG. 1 is a block diagram exemplary of the architecture of a system as described herein, FIGS. 2, 4, 6 and 7 are flow charts exemplary of possible operation of a system according to the arrangement described herein, and FIGS. 3 and 5 are functional/block diagrams representative of data handling in the arrangement described herein.

DETAILED DESCRIPTION OF PREFERRED EMBODIMENTS OF THE INVENTION

The arrangement described herein comprises the entities listed in the following:

computer system: as used herein, this designates any system able to perform computations, store data, run applications, and be programmed by means of specific development environments and programming languages, such as C, C++, Java, C# and so on. Therefore, a computer system (CS, in FIG. 1) can be a personal computer, a notebook, a laptop, a Personal Digital Assistant (PDA), a smartphone, and so on. The computer system is also able to interface a SIM.

SIM: as used herein, this designates a SIM card or a USIM card, typically used in mobile networks, such as GSM or UMTS networks respectively, to control and protect the user access to the network resources. Specifically, in order to gain access to a mobile network, a user must be authenticated. In a GSM/UMTS network this authentication is implemented as a challenge-response mechanism. The network sends a random value, called RAND, to the user mobile phone, which, in turn, forwards the value to the SIM. The SIM, which contains a unique secret key, called Ki, encrypts this RAND with a mobile operator dependent algorithm called A3, in order to produce an authentication response SRES. This authentication response is returned to the network which, knowing the SIM key Ki, performs the same computation and checks its SRES against the one supplied by the user. If the two values match, the access is granted to the user, otherwise the access request is rejected. In the former case, the SIM will also encrypt the RAND value with another mobile operator dependent algorithm, called A8, and with the key Ki, to produce a session key, called Kc. This key will be passed to the mobile phone, in order to protect the radio link between the mobile phone and the GSM/UMTS transceiver station.

processing module: as used herein, this designates a software component installed in the computer system CS, able to communicate with both the SIM and an operating system installed in the computer system CS. Specifically, this processing module is able to perform cryptographic operations on sensitive data stored in the computer system CS and on user credentials needed to get access to the operating system.

user: the user is the legitimate owner of the SIM and the sensitive data to be protected.

Advantageously, the SIM involved in the present invention does not require any customization or modification, because the arrangement described herein only makes use of the embedded standard (e.g. GSM or UMTS) security functions.

The following description refers, by way of example only, to a possible embodiment of the arrangement described herein based on a GSM network and a related SIM infrastructure. Those of skill in the art will promptly appreciate that the arrangement described herein can be adapted for operation within the framework of e.g. a UMTS network, by exploiting the related USIM infrastructure. The same can apply to any other network framework supported by a subscriber identity infrastructure essentially similar to the SIM infrastructure.

As used herein, the term "SIM" is therefore intended to encompass all these alternative infrastructures based on the same operating principles.

Specifically, the SIM can be interfaced to the computer system CS by several methods, such as, but not limited to (see FIG. 1):

a standard PCSC reader 10;

a mobile phone/terminal through a Bluetooth channel 20 (used as a wireless SIM reader);

a mobile phone/terminal through an IrDA channel 25 30, or a mobile phone/terminal 40 through a cable connected to a serial/parallel/USB/Firewire port (used as a wired SIM reader).

Of course, it is expected that technological evolution will provide new devices and protocols to interface a SIM to a computer system. The present invention thus encompasses the possible use of such new devices and protocols.

The arrangement described herein will be discussed in relationship with two basic exemplary embodiments:

SIM-based sensitive data protection,

SIM-based local access protection

As far as the first embodiment is concerned, the SIM is involved to generate strong cryptographic keys which will be used by a symmetric-key algorithm, such as, but not limited to: AES, 3DES, RC6, Serpent or Twofish, to encrypt the user sensitive data. The symmetric-key algorithm is stored into the processing module. In this context, sensitive data include any digital information that can be stored on a computer system, such as files, folders, virtual disks, software licenses, documents, and so on. Only the authorized SIM will be able, later, to rebuild the same cryptographic keys and, therefore, to decrypt and access the data. No user passwords or passphrases are needed during both the encryption and the decryption processes.

The second embodiment makes use of a similar approach to provide a SIM-based local access service into the computer system CS. In that case, access to the operating system will be permitted only if the SIM interfaced to the computer system CS is able to decrypt the user credentials needed to get access to the computer system itself. The user credentials can be stored on a remote database or locally in the computer system CS. According to the first embodiment of the present invention, SIM-based sensitive data encryption is based on the procedure represented by the flow chart of FIG. 2.

In a step 100, the user requests protection, for example, for a selected set of sensitive data. For instance, in a Microsoft Windows™ platforms, the user can select files and folders to be protected within the file manager Explorer™. Then, by means of a context menu (right click), he or she can choose e.g. a "SIM Encrypt" menu entry, made available by the processing module.

In a step 102, the processing module starts checking the presence of a SIM connected to the computer system CS. If a SIM is found, the processing module checks if the SIM access is PIN protected, and, if needed, it requests the user to enter a corresponding PIN, for instance by means of a GUI (Graphical User Interface).

Once completing access in a step 104 (directly if the SIM is not PIN protected or if the user supplied PIN is correct), the processing module generates two random values RAND1 and RAND2, in particular two 128 bit random values (step 106).

These two random values RAND1 and RAND2 are then forwarded to the A8 GSM security algorithm stored on the SIM (see e.g [GSM Technical Specification GSM 03.20 (ETSI TS 100 929 v8.1.0): "Digital cellular telecommunication system (Phase 2+); Security Related network functions", European Telecommunications Standards Institute, July 2001]; or from the [GSM Technical Specification GSM 11.11 (ETSI TS 100 977 v8.3.0): Digital cellular telecommunication system (Phase 2+); Specification of the Subscriber Identity Module—Module Equipment (SIM-ME) interface", European Telecommunication Standards Institute, August 2000]).

This returns two session keys Kc1 and Kc2, in particular two 64-bit session keys, computed in a step 108 as Kc1=A8 (RAND1) and Kc2=A8(RAND2) and based on the secret Ki of the SIM.

These two session keys Kc1 and Kc2 are subsequently mixed by means of a hash function h such as, but not limited to, a SHA-1 function (see e.g. [National Institute of Standards and Technology (NIST), "Federal Information Processing Standards Publication 180-2—SECURE HASH STANDARD (SHS)", August 1, 2002] or a MD5 function (see e.g. [A. J.

Menezes, P. C. van Oorschot, S. A. Vanstone, "Handbook of Applied Cryptography", CRC Press, ISBN: 0-8493-8523-7, October 1996].

This operation produces, in a step 110, an encryption key K=h(Kc1, Kc2).

More generally, the encryption key K can be computed by taking advantage of both the authentication signed responses SRES obtained via the authentication challenges (random values) RAND1 and RAND2 and the session keys Kc1, Kc2, mixed by a function f, that is: K=f(Kc1, Kc2, . . . , Kcn, SRES1, SRES2, . . . , SRESn). In this way, to get a longer and more secure encryption key K, it is possible to operate on both the mixer function f and the number of authentication challenges n used. Finally, the mixer function f can also introduce an additional secret not tied to the GSM security functions. For instance, the mixer function f can include a user specific secret key $K_U$ in order to make the encryption key K unpredictable also for the mobile operator, which usually knows the key Ki embedded into the SIM.

Therefore in this case: K=f(Ku, Kc1, Kc2, . . . , Kcn, SRES1, SRES2, . . . , SRESn). The mixer function f could be, for instance, a Message Authentication Code (MAC) function, such as, but not limited to, HMAC-SHA-1, HMAC-MD5, AES-XCBC-MAC.

In a step 112, the processing module can also generate a random vector to be used as an Initialization Vector (IV), to encrypt the sensitive data with a symmetric key cipher in CBC mode (Cipher Block Chaining: see again, the Menezes et al. reference already cited in the foregoing). Of course other cipher modes can be used, such as, but not limited to, CFB (Cipher FeedBack), or OFB (Output FeedBack). The bit-length of the random vector depends on the specific algorithm chosen. For instance, in case of the AES (Advanced Encryption Standard), the random vector length is 128 bit.

The random vector can also be omitted according to the specific mode used for the cipher (for instance in ECB mode, Electronic Code Book: see again Menezes at al.).

In a step 114, the processing module encrypts the selected sensitive data with the encryption K and the random vector IV, for instance using the AES cipher in CBC mode. Other symmetric ciphers can be used, for instance, but not limited to, 3DES, RC6, Serpent, or Twofish.

As an option, the processing module can also compress the encrypted sensitive data before the encryption phase, in order to reduce the size of the data to be handled, and to make the encrypted sensitive data more independent from a statistical point of view. To this aim, it is possible to use several non-lossy compressing algorithms, such as, but not limited to, PKZIP, GZIP, RAR, ACE, ARJ, or LZH.

The encrypted sensitive data ESD (see FIG. 3) will be then stored in the computer system CS along with a crypto header CH. In particular, the crypto header CH contains the information for the decryption phase.

Specifically, the crypto header CH can include the fields shown in FIG. 3:
- the two random values RAND1 and RAND2;
- the random vector IV;
- a string Version comprises information such as processing module version, cipher, cipher mode, compression algorithm used, and other data; and
- a cryptographic checksum $MAC_K$, associated to the encrypted sensitive data, and including the three previous fields based on the encryption key K. For instance, the HMAC-SHA-1 algorithm can be used for this purpose, but any other MAC (Message Authentication Code) algorithms can be used, for instance, but not limited to, HMAC-SHA-1, HMAC-MD5, or AES-XCBC-MAC.

The process is repeated for each group of sensitive data selected by the user.

It will be appreciated that the use of the cryptographic checksum $MAC_K$ provides protection against unauthorized modifications of the encrypted sensitive data in terms of detection. In fact, an adversary, without the knowledge of the encryption key K, is not able to change the encrypted sensitive data along with the integrity of the cryptographic checksum $MAC_K$.

The processing module can also implement a separation between the cryptographic key K and a key $K_{int}$ used for integrity. For instance, the processing module can derive a key $K_{Enc}=f_1(K)$ to encrypt the sensitive data and a key $K_{Int}=f_2(K)$ to "MAC" the file, as usually suggested by the best practice in cryptographic.

The processing module does not store any SIM identifier into the crypto header CH, such as the SIM IMSI (International Mobile Subscriber Identity), the SIM MSIDSN (Mobile Subscriber ISDN) or the SIM serial number. This provides a greater privacy level with respect to the user encrypted sensitive data.

However, it would be possible to add this information within the crypto header CH, in order to speed-up the decryption procedure. In this case, the SIM will check the presence of its identifier into the crypto header CH before starting the decryption of the sensitive data.

SIM-based sensitive data decryption procedure is based on the procedure represented by the flow chart of FIG. 4.

In a step 200, the user requests access to the selected set of sensitive data. For instance, in a Microsoft Windows™ platforms, the user can select the sensitive data to be protected within the file manager Explorer™. Then, by means of a context menu (right click), he or she can select a "SIM Decrypt" menu entry, made available by the processing module.

In a step 202, the processing module starts checking the presence of a SIM connected to the computer system CS by means for instance, but not limited to:
- a standard PCSC reader;
- a mobile phone through a Bluetooth channel;
- a mobile phone through an IrDA channel, or
- a mobile phone through a cable connected to the serial/parallel/USB/Firewire port.

If a SIM is found, the processing module checks if the SIM access is PIN protected, and, if required, requests the user to enter a PIN, for instance by means of a GUI (Graphical User Interface).

Once SIM access is achieved in a step 204 (directly if the SIM is not PIN protected, or if the user supplied PIN is correct), the processing module parses, in a step 206, the crypto header CH fields associated to the encrypted sensitive data, and, in particular, the string Version and the two random values RAND1 and RAND2. Specifically, it checks if the processing module version used to encrypt the sensitive data is compliant with the supported ones (for instance in terms of ciphers, modes, compressing algorithms, and so on). In this case, the processing module forwards the two random values RAND1 and RAND2 to the A8 GSM security algorithm stored in the SIM, whose execution in a step 208 returns two session keys Kc1 and Kc2, in particular two 64-bit session keys Kc1 and Kc2 computed as Kc1=A8(RAND1) and Kc2=A8(RAND2).

In a step 210, these two session keys Kc1, Kc2 are subsequently mixed by means of a hash function h, such as, but not limited to a SHA-1 function or a MD5 function.

This operation produces a decryption key K=h(Kc1, Kc2).

More generally, the decryption key K can be computed by taking advantage of both the authentication signed responses SRES obtained via the authentication challenges (random values) RAND1 and RAND2 and the session keys Kc1, Kc2, mixed by a function f, that is: K=f(Kc1, Kc2, . . . , Kcn, SRES1, SRES2, . . . , SRESn). In this way, to get a longer and more secure decryption key K, it is possible to operate on both the mixer function f and the number of authentication challenges n used. Finally, the mixer function f can also introduce an additional secret information not tied to the GSM security functions. For instance, the mixer function f can include a user specific secret key $K_U$ in order to make the decryption key K unpredictable also for the mobile operator, which usually knows the key Ki embedded into the SIM. Therefore in this case: K=f($K_U$, Kc1, Kc2, . . . , Kcn, SRES1, SRES2, . . . , SRESn). The mixer function f could be, for instance, a Message Authentication Code (MAC) function, such as, but not limited to, HMAC-SHA-1, HMAC-MD5, or AES-XCBC-MAC.

At this point the processing module can verify, in a step 212, the cryptographic checksum $MAC_K$, contained within the crypto header CH, by means of the decryption key K.

In case of a successful verification, the processing module proceeds, in a step 214, with the decryption of the encrypted sensitive data, otherwise it concludes that the SIM is not authorized to access the encrypted sensitive data or that the encrypted sensitive data have been modified. In this case, an alert is raised.

Specifically, if the cryptographic checksum verification phase is successful, the processing module decrypts the encrypted sensitive data using the decryption key K, the random vector IV, contained within the crypto header CH and the cipher and the cipher mode specified by the string Version, also contained within the crypto header CH. It also removes the crypto header CH from the decrypted sensitive data, and, in case, it decompresses the sensitive data after decryption, according to the compression algorithm specified into the string Version.

The process is repeated for each group of sensitive data selected by the user.

The arrangement described herein also provides a key recovery service. In fact, if the user's SIM is unavailable, due, for instance, to the SIM having been lost or hardware failure, the user can rebuild the encryption key K asking to the mobile operator for the two session keys Kc1, Kc2 associated to the random values RAND1 and RAND2 included into the crypto header CH of the encrypted sensitive data. Therefore, the user can decrypt all the protected sensitive data and re-encrypt them by means of a new SIM. As already indicated, the proposed arrangement is also adapted to operate in connection with a UMTS SIM, usually called USIM. This is due to the fact that the UMTS takes advantage of the same security functions of the GSM (A3 and A8 GSM security algorithms). The second embodiment described herein relates to a SIM-based local access protection. Specifically, the arrangement can be used with any operating system which offers password-based user authentication facilities, such as, but not limited to, Windows NT/2000/XP, Sun Solaris, Linux, or MAC-OS.

In this embodiment the user credentials are protected according to the first embodiment and stored either locally in the computer system CS, or remotely on a database. When the user wants to logon on the computer system CS, the SIM is interfaced to the computer system CS and an encryption key K is generated according to the previous procedure described in the foregoing in connection with FIG. 2. The encryption key K is subsequently used to decrypt the user credentials and to pass them to the underlying operating system, which completes the authentication phase, as usual, checking these user credentials.

More precisely, this second embodiment involves two different procedures, namely:
- a user registration procedure
- a SIM-based logon procedure.

During the user registration procedure, the user credentials are encrypted by means of an encryption key K generated by the user SIM, in accordance with the procedure described in the foregoing in connection with FIG. 2. The encrypted user credentials will be stored in a record on a remote database, or locally in the computer system CS, such as within a configuration file or a system registry. With respect to the first embodiment, now an identification parameter for the SIM is stored in order to establish a relationship, in the computer system CS, between the user credentials and the corresponding user SIM. In this second embodiment, as shown in FIG. 5, the IMSI (International Mobile Subscriber Identity) is used as a unique identifier for the SIM. Nonetheless, other identifiers can be used such as, but not limited to, the SIM MSIDSN (Mobile Subscriber ISDN) or the SIM serial number.

Figure 6:
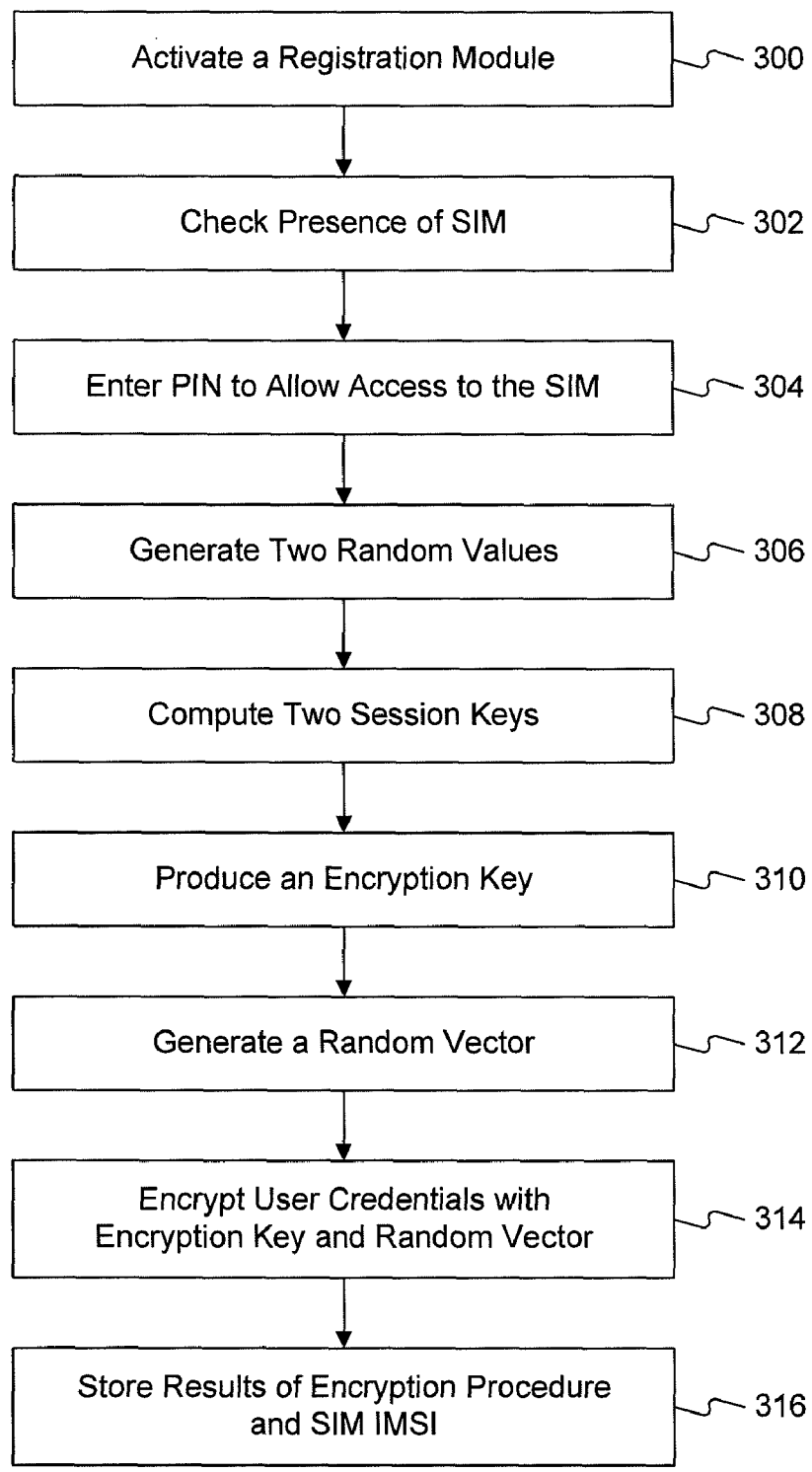

The user registration procedure is based on the steps shown in FIG. 6.

The user SIM is interfaced to a registration server, for instance by means, but not limited to:
- a standard PCSC reader;
- a mobile phone through a Bluetooth channel;
- a mobile phone through an IrDA channel, or
- a mobile phone through a cable connected to the serial/parallel/USB/Firewire port.

A registration module is activated in a step 300. This registration module asks for the user credentials, such as username and password of the user associated to the connected SIM. According to the operating system, other information could be included within the user credentials, such as a network domain, as usual in the Microsoft Windows platforms.

The registration module encrypts the provided user credentials, according to a procedure involving steps 302 to 314 that are essentially identical to steps 102 to 114 described in the foregoing in connection with FIG. 2.

In a step 316 the result of the encryption procedure (crypto header CH and encrypted data ED) is stored, along with the SIM IMSI, in a record on a remote database, or locally in the computer system CS (see also FIG. 5).

Once the user has been registered, he or she can logon into the computer system CS, following the SIM-based logon procedure described in the following.

Figure 7:
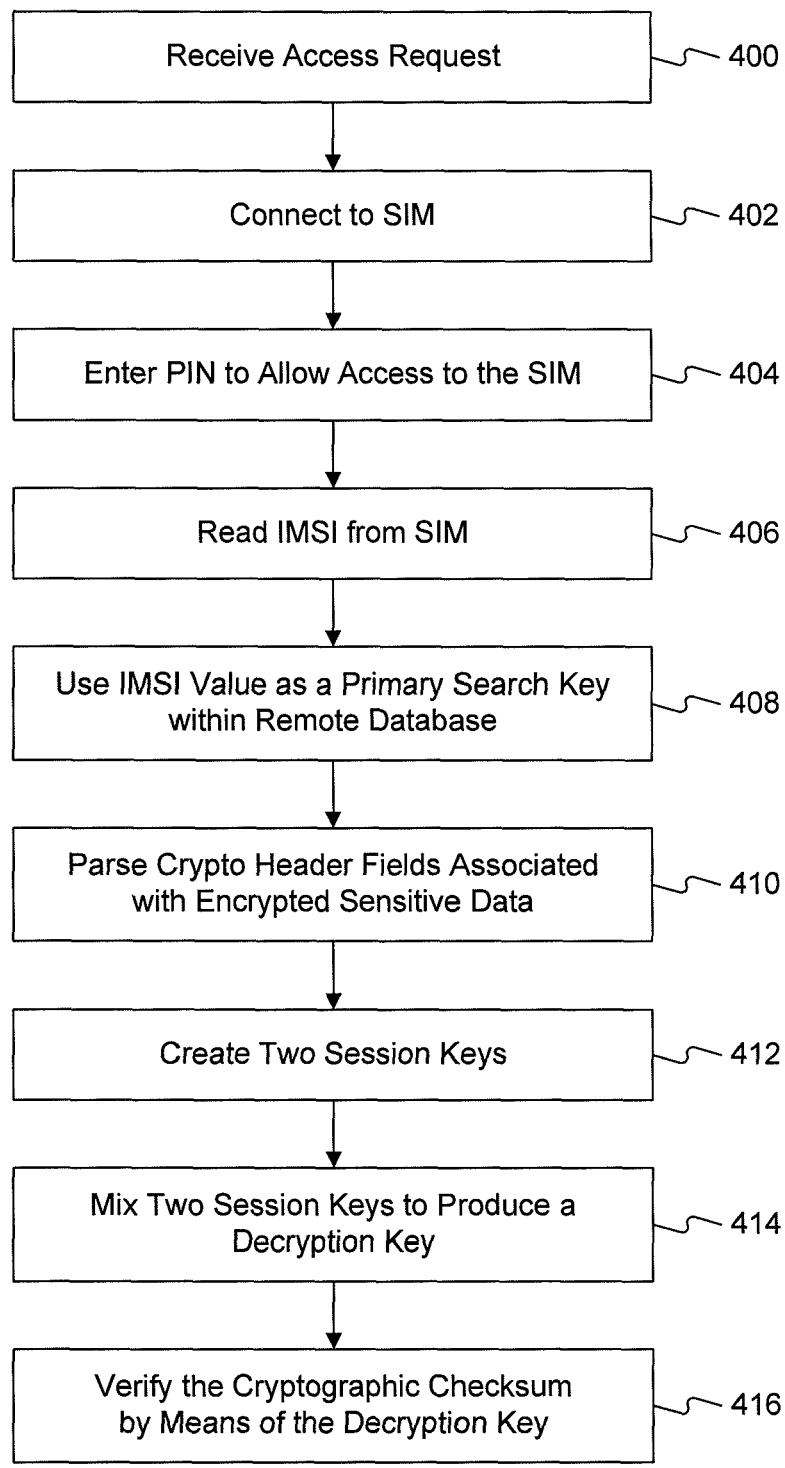

In the exemplary SIM-based logon procedure shown in FIG. 7, the user SIM is assumed to be interfaced to the computer system CS, for instance, but not limited to:

a standard PCSC reader;
a mobile phone through a Bluetooth channel;
a mobile phone through an IrDA channel, or
a mobile phone through a cable connected to the serial/parallel/USB/Firewire port.

Upon receiving the access request (step 400) and connecting to the SIM (step 402) a processing module which is listening on the previous communication channels, detects the presence of a SIM (FIG. 7). The processing module is stored on the computer systems CS.

The processing module checks if the SIM access is PIN protected, and, if required, requests the user to enter the corresponding PIN, for instance by means of a GUI (Graphical User Interface).

Once completing the access in a step 404 (directly, if the SIM is not PIN protected, or if the user supplied PIN is correct), in a step 406, the processing module reads the IMSI from the SIM. Then, it uses this value, in a step 408, as a primary search key within the remote database or in the computer system CS.

In case of a match, the processing module reads the record or the configuration file/system registry and performs the process detailed in the foregoing (during steps 410 to 414, such steps being essentially identical to steps 206 to 210 of FIG. 4) to decrypt the user credentials.

After decryption (which occurs in a step 414), the processing module forwards the user credentials directly to the operating system, which, in turn, will authenticate the user as usual. The processing module is also responsible for securely wiping the decrypted user credentials, in order to prevent unauthorized user credentials recovery.

The proposed solution improves the overall security level. In fact, the user is no longer required to type his or her password at each logon. In this way passwords can be selected according to a stricter security policy, in terms of composition, length and cycle time. Therefore, traditional attacks, such as brute force attacks, dictionary attacks or social engineering techniques cannot be further applied. At the same time, the user credentials are SIM protected: the compromise solution of causing the database to contain the encrypted user credentials is useless without the possession of the SIM and knowledge of the corresponding PIN. Moreover, each user credentials are encrypted by means of a different SIM-dependent key. This fact significantly contributes to mitigating the risks associated with a compromised database.

As already indicated the invention operates also in connection with other SIM-type cards such as e.g. a UMTS SIM, usually called USIMs. This is due to UMTS taking advantage of the same security functions of GSM (A3 and A8 GSM security algorithms). Additionally, USIMs include security functions whereby one or more keys (CK, IK) can be generated starting from a single authentication RAND.

In case of USIMs, cryptographic keys can be generated starting from even a single random value RAND along the lines of the method described in the foregoing.

Therefore, without prejudice to the underlying principles of the invention, the details and embodiments may vary, also significantly, with respect to what has been described, by way of example only, without departing from the scope of the invention as defined in the claims that follow. In that respect, it will be appreciated that the wording "cipher processing" applies indifferently both to encrypting data (plaintext) to generate encrypted data and to decrypting encrypted data to recover therefrom decrypted plaintext data.

The advantages that may be achieved with the arrangement illustrated are described below.

Specifically, the arrangement described herein makes use of a fully standard SIM, which is a widely deployed and accepted device, to securely generate strong cryptographic keys of variable lengths, in order to protect computer system resources, such as files, folders, software licenses, and so on, or the local access to the computer system itself.

In particular, the SIM does not require any customization or modification to correctly operate within the framework of the arrangement described herein. The SIM does not need to be modified by a SIM Application Toolkit (SAT) or any other similar technology, to work as a smart card or to handle digital certificates.

Further, the arrangement described herein is also fully compliant with any operating system whose user authentication procedures are password-based.

Moreover, it does not require any changes in the user administration procedures. This is due to the fact that the arrangement described herein protects the operating system user credentials or the operating system user profile by means of the SIM, but without changing the user credentials or the user profile itself.

In addition, the user is not required to type his or her password. For this reason, passwords and pass phrases can be chosen according to a more stringent security policy, in order to preclude attacks such as dictionary, brute force or social engineering. The arrangement described herein does not directly authenticate the users when they get access to the computer system: in fact, it protects the user credentials to access the operating system while the operating system will maintain its role in authenticating the users as this is typically done in a computer system environment.

The invention claimed is:

1. A method for cipher controlled exploitation of data resources stored in a remote database associated with a computer system, the method comprising the steps of:

providing a subscriber identity module carrying at least one security algorithm, said subscriber identity module not used, either directly or indirectly, by said computer system for communication with a network;

producing a cipher key via said at least one security algorithm;

using said cipher key for protecting said data resources; and storing said protected data resources in said remote database in an encrypted format, wherein producing the cipher key comprises generating at least two random values, subjecting said at least two random values to said at least one security algorithm to generate at least two session keys, and combining said at least two session keys via a mixer function to produce a cipher key.

2. The method according to claim 1, wherein said step of using said cipher key for protecting said data resources comprises the steps of:
encrypting said data resources by means of said cipher key;
storing said encrypted data resources in said remote database associated with said computer system;
retrieving said encrypted data resources from said remote database; and decrypting said encrypted data resources by means of said cipher key.

3. The method according to claim 1, wherein said mixer function comprises a hash function.

4. The method according to claim 1, comprising the step of selecting said data resources from user sensitive data or user credentials.

5. The method according to claim 4, wherein said step of using said cipher key for protecting said data resources comprises the step of encrypting by means of said cipher key, said user sensitive data or said user credentials from plain text into an encrypted format.

6. The method according to claim 5, wherein said step of using said cipher key for protecting said data resources comprises the step of decrypting by means of said cipher key said user sensitive data or said user credentials from an encrypted format into plain text.

7. The method according to claim 5, wherein said user sensitive data or said user credentials in encrypted format have a cryptographic header associated therewith.

8. The method according to claim 7, wherein said cryptographic header comprises an identifier of said subscriber identity module and a cryptographic checksum based on said cipher key, said cryptographic checksum being used for detecting any unauthorized modifications of said encrypted format.

9. The method according to claim 4, wherein said data resources are user credentials and said data resources based on said user credentials are stored in said remote database in an encrypted format.

10. The method according to claim 9, comprising the step of establishing a relationship between said user credentials stored in said encrypted format in said remote database and a corresponding user subscriber identity module.

11. The method according to claim 10, wherein said relationship is established by means of an identifier of said subscriber identity module.

12. The method according to claim 11, comprising the step of using said identifier for searching within said remote database to permit user exploitation of said user credentials.

13. A non-transitory computer readable medium encoded with a computer program product loadable into a memory of at least one computer, the computer program product comprising software code portions for performing the method of claim 1.

14. A method for cipher controlled exploitation of data resources stored in a remote database associated with a computer system, the method comprising the steps of:
providing a subscriber identity module carrying at least one security algorithm;
producing a cipher key via said at least one security algorithm, wherein producing the cipher key comprises: generating at least two random values, subjecting said at least two random values to said at least one security algorithm to generate at least two session keys, and combining said at least two session keys via a mixer function to produce the cipher key;
using said cipher key for protecting said data resources; and
storing said protected data resources in said remote database in an encrypted format.

15. A method for cipher controlled exploitation of data resources stored in a remote database associated with a computer system, the method comprising the steps of:
providing a subscriber identity module carrying at least one security algorithm;
generating at least one random value;
subjecting the at least one random value to the at least one security algorithm to generate at least one session key;
providing a mixer function;
inserting in the mixer function a user specific secret unrelated to said subscriber identity module security algorithm;
processing the at least one session key via the mixer function to produce a cipher key,
wherein the cipher key is a function of both the user specific secret and the at least one session key;
using said cipher key for protecting said data resources; and
storing said protected data resources in said remote database in an encrypted format.

16. A system for cipher-controlled exploitation of data resources, comprising:
at least one subscriber identity module carrying at least one security algorithm;
at least one computer system comprising at least one processing module, said subscriber identity module not used, either directly or indirectly, by said at least one computer system for communication with a network and said at least one processing module being interfaced with said at least one subscriber identity module to generate a cipher key via said at least one security algorithm and being configured to protect via said cipher key said data resources; and
a remote database associated with said at least one computer system for storing said protected data resources by said cipher key in an encrypted format, wherein generating the cipher key comprises generating at least two random values, subjecting said at least two random values to said at least one security algorithm to generate at least two session keys, and combining said at least two session keys via a mixer function to produce a cipher key.

17. The system according to claim 16, wherein said at least one processing module is configured for:
encrypting said data resources by means of said cipher key;
storing said encrypted data resources in said remote database associated with said at least one computer system;
retrieving said encrypted data resources from said remote database; and decrypting said encrypted data resources by means of said cipher key.

18. The system according to claim 16, wherein said remote database is included in said at least one computer system.

19. The system according to claim 16, wherein said at least one processing module is interfaced with said at least one subscriber identity module via a smart card reader or a Bluetooth mobile terminal or an IrDA mobile terminal or a mobile terminal through a cable.

20. The system according to claim 16, wherein said at least one computer system comprises a personal computer or a notebook or a laptop or a PDA, or a smart phone.

21. A communication network comprising a system according to claim 16.

* * * * *